United States Patent
Fuldseth et al.

(10) Patent No.: US 10,009,620 B2
(45) Date of Patent: Jun. 26, 2018

(54) COMBINED CODING OF SPLIT INFORMATION AND OTHER BLOCK-LEVEL PARAMETERS FOR VIDEO CODING/DECODING

(71) Applicant: Cisco Technology, Inc., San Jose, CA (US)

(72) Inventors: Arild Fuldseth, Lysaker (NO); Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/008,677

(22) Filed: Jan. 28, 2016

(65) Prior Publication Data
US 2016/0373778 A1  Dec. 22, 2016

Related U.S. Application Data

(60) Provisional application No. 62/182,852, filed on Jun. 22, 2015.

(51) Int. Cl.
*H04N 19/51* (2014.01)
*H04N 19/103* (2014.01)
(Continued)

(52) U.S. Cl.
CPC .......... *H04N 19/51* (2014.11); *H04N 19/103* (2014.11); *H04N 19/119* (2014.11);
(Continued)

(58) Field of Classification Search
CPC ...... H04N 19/119; H04N 19/52; H04N 19/51; H04N 19/103; H04N 19/176; H04N 19/44; H04N 19/70; H04N 19/91
See application file for complete search history.

(56) References Cited

U.S. PATENT DOCUMENTS 8,208,742 B2   6/2012   Cheon
8,223,843 B2   7/2012   Lee et al.
(Continued)

FOREIGN PATENT DOCUMENTS

EP   2739057 A1   6/2014
WO   2011160010 A1   12/2011

OTHER PUBLICATIONS

International Search Report and the Written Opinion, PCT/US2016/038327, dated Aug. 11, 2016, 12 pages.
(Continued)

*Primary Examiner* — Obafemi Sosanya
(74) *Attorney, Agent, or Firm* — Edell, Shapiro & Finnan, LLC

(57) ABSTRACT

A block of size N×M of a video frame can be either split into smaller blocks in n different ways (e.g. horizontal, vertical, quad, etc.), or alternatively it can be coded using one out of m different coding modes (e.g. intra, inter, bi-prediction, etc.). Since splitting into smaller sub-blocks and coding the N×M block in one of the m possible ways are mutually exclusive, there are n+m distinct possibilities for processing the block further. The n+m possible ways of processing the N×M blocks are assigned a code (e.g., a number) and coded with a codeword derived from a VLC table. This achieves efficient combined coding of split information and other block-level parameters.

24 Claims, 7 Drawing Sheets

(51) Int. Cl.
  *H04N 19/119*  (2014.01)
  *H04N 19/91*   (2014.01)
  *H04N 19/176*  (2014.01)
  *H04N 19/70*   (2014.01)

(52) U.S. Cl.
  CPC ........... *H04N 19/176* (2014.11); *H04N 19/70* (2014.11); *H04N 19/91* (2014.11)

(56) References Cited

U.S. PATENT DOCUMENTS

| | | |
|---|---|---|
| 8,306,347 B2 | 11/2012 | Bjontegaard et al. |
| 8,335,261 B2 | 12/2012 | Karczewicz et al. |
| 8,446,959 B2 | 5/2013 | Lee et al. |
| 8,565,314 B2 | 10/2013 | Karczewicz et al. |
| 8,594,183 B2 | 11/2013 | Han et al. |
| 8,768,081 B2 | 7/2014 | Jung et al. |
| 8,780,993 B2 | 7/2014 | Lee et al. |
| 8,798,159 B2 | 8/2014 | Han et al. |
| 8,837,590 B2 | 9/2014 | Alshina et al. |
| 8,842,927 B2 | 9/2014 | Cheon et al. |
| 8,885,704 B2 | 11/2014 | Chien et al. |
| 8,885,723 B2 | 11/2014 | Lee et al. |
| 8,885,724 B2 | 11/2014 | Lee et al. |
| 8,885,725 B2 | 11/2014 | Lee et al. |
| 8,885,958 B2 | 11/2014 | Jung et al. |
| 8,938,006 B2 | 1/2015 | Lee et al. |
| 9,049,460 B1 | 6/2015 | Min et al. |
| 9,131,232 B2 | 9/2015 | Jung et al. |
| 2011/0243225 A1 | 10/2011 | Min et al. |
| 2011/0310976 A1 | 12/2011 | Wang et al. |
| 2012/0147971 A1 | 6/2012 | Chien et al. |
| 2012/0183074 A1 | 7/2012 | Fuldseth |
| 2013/0003871 A1 | 1/2013 | Bjontegaard et al. |
| 2013/0039422 A1 | 2/2013 | Kirchhoffer et al. |
| 2014/0003525 A1 | 1/2014 | Fuldseth |
| 2014/0029670 A1* | 1/2014 | Kung ............... H04N 19/00763 375/240.16 |
| 2014/0056360 A1 | 2/2014 | Han et al. |
| 2015/0078450 A1* | 3/2015 | Chen ............... H04N 19/00769 375/240.16 |

OTHER PUBLICATIONS

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Lim et al., "Description of video coding technology proposal by SK telecom, Sejong Univ. and Sungkyunkwan Univ.", Joint Collaborative Team on Video Coding (JCT-VC) of ITU-T SG16 WP3 and ISO/IEC JTC1/SC29/WG11, Apr. 2010, pp. 1-41.

"Text of ISO/IEC FDIS 14496-10; Information Technology—Coding of audio-visual objects—Part 10: Advanced Video Coding", International Organisation for Standardisation Organisation Internationale De Normalisation ISO/IEC JTC 1/SC 29/WG 11 Coding of Moving Pictures and Audio, Mar. 31, 2003, 270 pages.

Yang et al., "CTB splitting on frame boundary for arbitrary resolution video", Joint Collaborative Team on Video Coding (JCT-VC) of ITU-T SG16 WP3 and ISO/IEC JTC1/SC29/WG11, Oct. 1, 2010, pp. 1-4.

Kim et al., "Enlarging MB size for high fidelity video coding beyond HD", ITU-Telecommunications Standardization Sector Study Group 16 Question 6, Video Coding Experts Group (VCEG), Oct. 2010, pp. 1-6.

"Test Model under Consideration", Joint Collaborative Team on Video Coding (JCT-VC) of ITU-T SG16 WP3 and OSO/IEC JTC1/SC29/WG11, Apr. 2010, pp. 1-153.

\* cited by examiner

| | | VLC |
|---|---|---|
| SKIP | SKIP MODE | 1 |
| SPLIT | SPLIT | 01 |
| INTER 0 | INTER MODE WITH REFERENCE INDEX 0 | 001 |
| MERGE | MERGE MODE | 0001 |
| BIPRED | BIPRED MODE | 00001 |
| INTRA | INTRA MODE | 000001 |
| INTER 1 | INTER MODE WITH REFERENCE INDEX 1 | 0000001 |
| INTER 2 | INTER MODE WITH REFERENCE INDEX 2 | 00000001 |
| INTER 3 | INTER MODE WITH REFERENCE INDEX 3 | 00000000 |

FIG.4A

|  |  | VLC |
|---|---|---|
| ▭ | SPLIT MODE 1 | 001 |
| ▭ | SPLIT MODE 2 | 0001 |
| ▭ | SPLIT MODE 3 | 01 |
| SKIP | CODING MODE 1 | 1 |
| INTRA | CODING MODE 2 | 00001 |
| INTER | CODING MODE 3 | 000001 |
| BIPRED | CODING MODE 4 | 000000 |

FIG.4B

COMBINED CODING OF SPLIT INFORMATION AND OTHER BLOCK-LEVEL PARAMETERS FOR VIDEO CODING/DECODING

CROSS REFERENCE TO RELATED APPLICATION

This application claims priority to U.S. Provisional Patent Application No. 62/182,852, filed Jun. 22, 2015, the entirety of which is incorporated herein by reference.

TECHNICAL FIELD

The present disclosure relates to video encoding and decoding technology.

BACKGROUND

Video encoding and decoding is used to transmit and receive video content over communication networks. There are continuous efforts being made in this technology to improve the quality of the video given the bandwidth of the communication channel over which the video streams are sent.

BRIEF DESCRIPTION OF THE DRAWINGS

FIGS. 4A and 4B are diagrams illustrating examples of various processing modes that can be encoded, according to example embodiments.

DESCRIPTION OF EXAMPLE EMBODIMENTS

Overview

In accordance with one embodiment, a video encoding method is provided. In accordance with the video encoding method, a video frame is partitioned into a plurality of blocks. The partitioning can be a fixed partitioning into blocks of equal size that are typically processed in raster-scan order within a frame, or the partitioning can be an adaptive partitioning resulting, for example, from applying an adaptive hierarchical quad-tree structure that splits each of the fixed size blocks into smaller blocks. As used herein, a block can be either a fixed size block from a fixed partitioning scheme, or a sub-block representing a node in an adaptive hierarchical block structure (e.g. quad-tree structure). For each of the plurality of blocks, the block is either split into sub-blocks using one of n different partitioning modes or the block is coded using one of m different coding modes such that there are n+m processing modes for each block. Each block is encoded with a codeword representing one of the n+m processing modes for use in deriving an encoded bit-stream. If a hierarchical block structure is used, a codeword representing one of the n+m processing nodes is sent at/for each node in the hierarchical structure.

In accordance with another embodiment, a video decoding method is provided. An encoded bit-stream representing video frames to be decoded is received. From the encoded bit-stream a codeword is derived for each of a plurality of blocks partitioned from a given video frame, the codeword representing a processing mode, among a plurality of processing modes, for each block. It is determined from the codeword which one of n different partitioning modes is used for splitting a given block into sub-blocks or which one of m different coding modes is used for the given block of the plurality of blocks of the given video frame. The given block of the given video frame is then decoded based on the which one of n different partitioning modes or which one of m different coding modes is used for the given block of the plurality of blocks of the given video frame according to the codeword.

DETAILED DESCRIPTION

Figure 1:
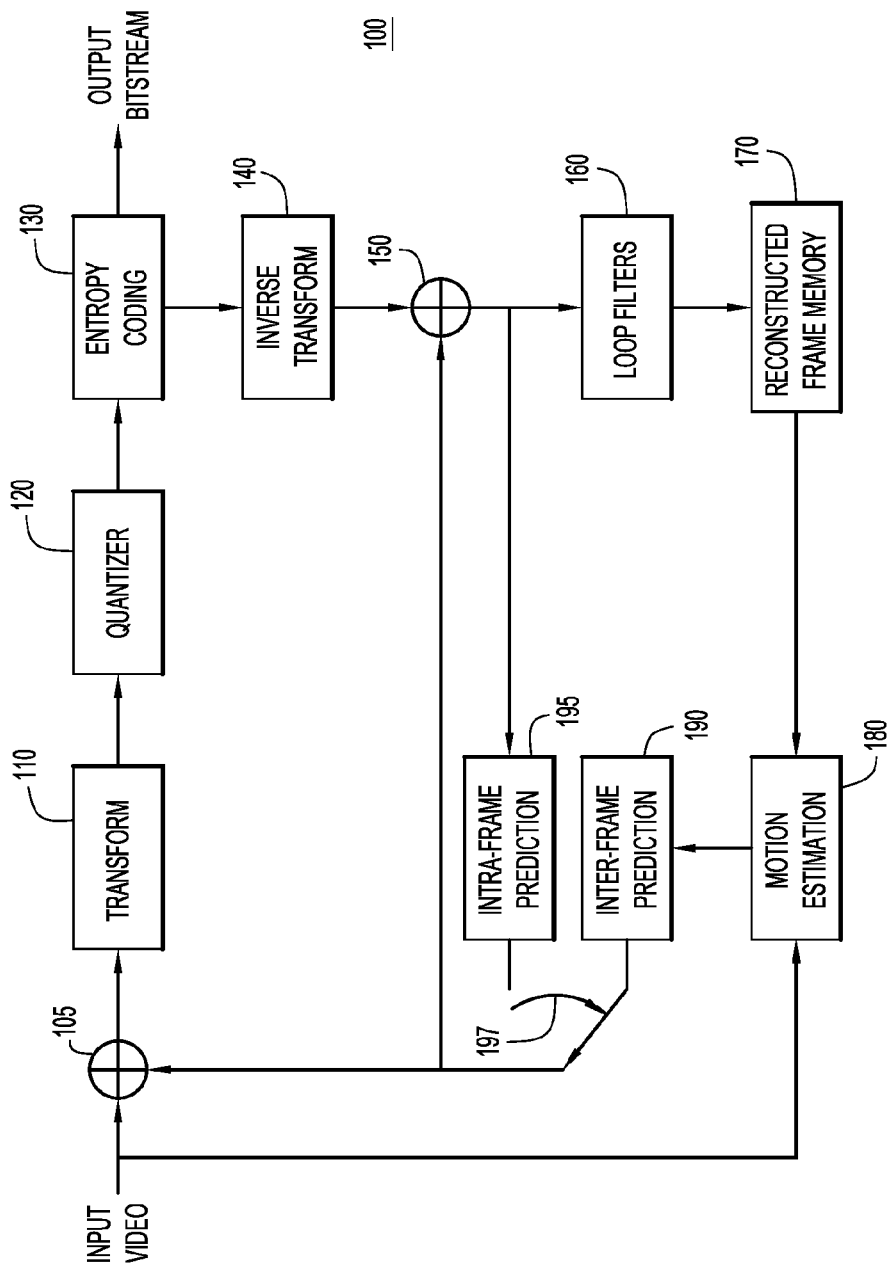
FIG. 1 is a block diagram of a video encoder according to an example embodiment.

Referring first to FIG. 1, a block diagram of a video encoder is shown at reference numeral 100. The video encoder 100 includes a subtractor 105, a transform unit 110, a quantizer unit 120, an entropy coding unit 130, an inverse transform unit 140, an adder 150, one or more loop filters 160, a reconstructed frame memory 170, a motion estimation unit 180, an inter-frame prediction unit 190, an intra-frame prediction unit 195 and a switch 197.

A current frame (input video) as well as a prediction frame are input to a subtractor 105. The subtractor 105 is provided with input from either the inter-frame prediction unit 190 or intra-frame prediction unit 195, the selection of which is controlled by switch 197. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 180 supplies a motion estimation output as input to the inter-frame prediction unit 190. The motion estimation unit 180 receives as input the input video and an output of the reconstructed frame memory 170.

The subtractor 105 subtracts the output of the switch 197 from the pixels of the current frame, prior to being subjected to a two dimensional transform process by the transform unit 110 to produce transform coefficients. The transform coefficients are then subjected to quantization by quantizer unit 120 and then supplied to entropy coding unit 130. Entropy coding unit 130 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 120 is also applied to the inverse transform unit 140 and used for assisting in prediction processing. The adder 150 adds the output of the inverse transform unit 140 and an output of the switch 197 (either the output of the inter-frame prediction unit 190 or the intra-frame prediction unit 195). The output of the adder 150 is supplied to the input of the intra-frame prediction unit 195 and to one or more loop filters 160 which typically removes blocking and transform coding artifacts to improve visual quality and better support prediction processing. The output of the loop filters 160 is applied to a reconstructed frame memory 170 that holds the processed image pixel data in memory for use in subsequent motion processing by motion estimation block 180.

Figure 2:
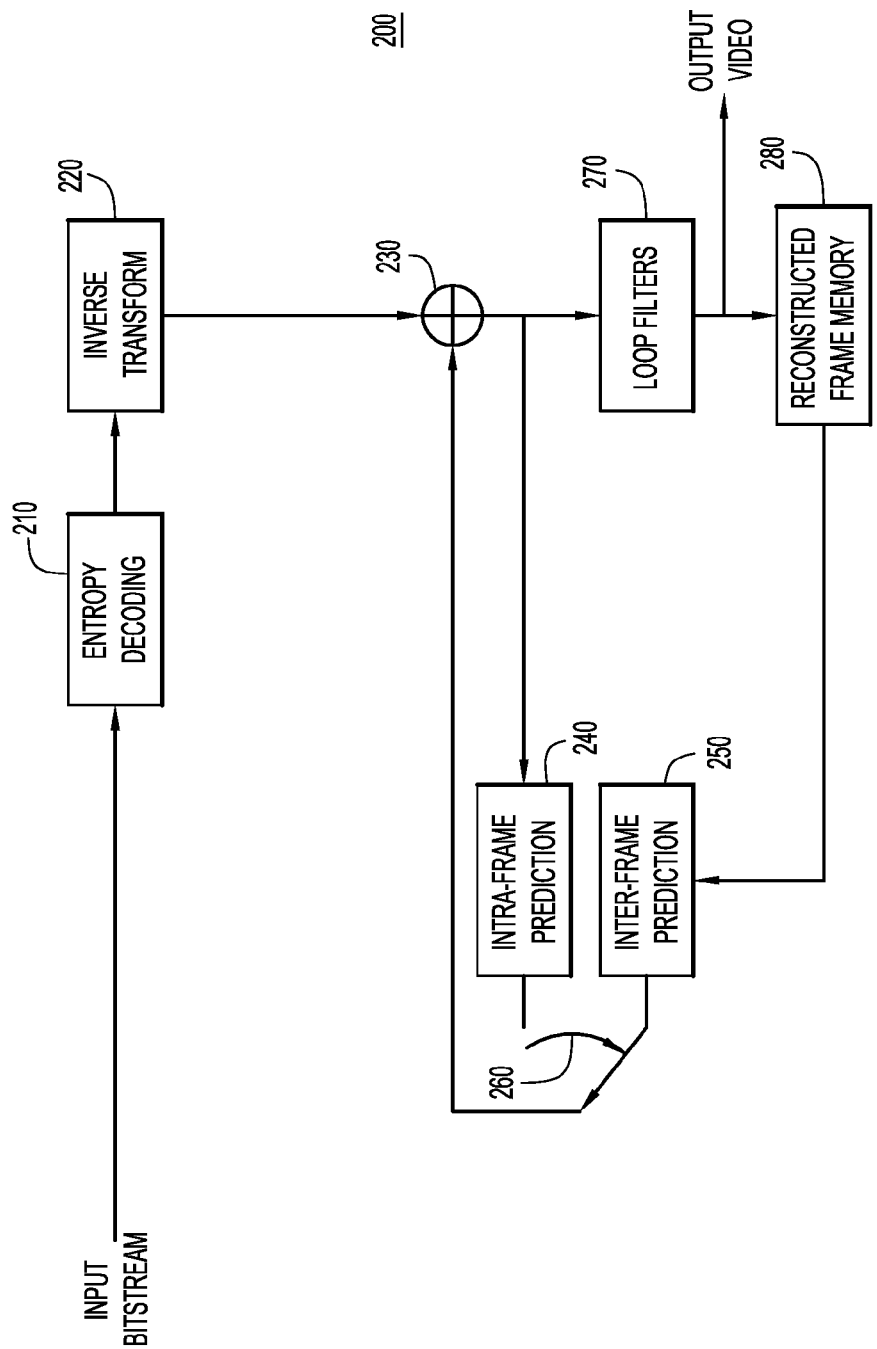
FIG. 2 is a block diagram of a video decoder according to an example embodiment.

Turning to FIG. 2, a block diagram of a video decoder is shown at reference numeral 200. The video decoder 200 includes an entropy decoding unit 210, an inverse transform unit 220, an adder 230, an intra-frame prediction unit 240, an inter-frame prediction unit 250, a switch 260, one or more loop filters 270 and a reconstructed frame memory 280. The entropy decoding unit 210 performs entropy decoding on the received input bitstream to produce quantized transform coefficients which are applied to the inverse transform unit 220. The inverse transform unit 220 applies two-dimensional inverse transformation to the quantized transform coefficients to output a quantized version of the difference samples. The output of the inverse transform unit 220 is applied to the adder 230. The adder 230 adds to the output of the inverse transform unit 220 an output of either the intra-frame prediction unit 240 or inter-frame prediction unit 250. The loop filters 270 operate similar to that of the loop filters 160 in the video encoder 100 of FIG. 1. An output video image is taken at the output of the loop filters 270.

The video encoder 100 of FIG. 1 and the video decoder of FIG. 2 may be implemented by digital logic gates in an integrated circuit (e.g., by an application specific integrated circuit) or by two or more separate logic devices. Alternatively, the video encoder 100 and video decoder 200 may be implemented by software executed by one or more processors, as described further in connection with FIG. 6, below.

Each of the functional blocks in FIGS. 1 and 2 are executed for each coding block, prediction block, or transform block.

In accordance with the example embodiments presented herein, video frames are coded by dividing/partitioning the frames into blocks. A block of size N×M can be either split into smaller sub-blocks in n different ways (e.g. horizontal, vertical, quad), or alternatively it can be coded using one out of m different coding modes (e.g. intra, inter, bi-prediction, etc.). Since splitting into smaller sub-blocks and coding the N×M block in one of the m possible ways are mutually exclusive, there are n+m distinct possibilities for processing the block further. The n+m possible ways of processing the N×M blocks are numbered and coded with a codeword, e.g., a codeword from a variable length code (VLC) table. Based on information from the neighbor blocks, different VLC tables may be used.

Figure 3:
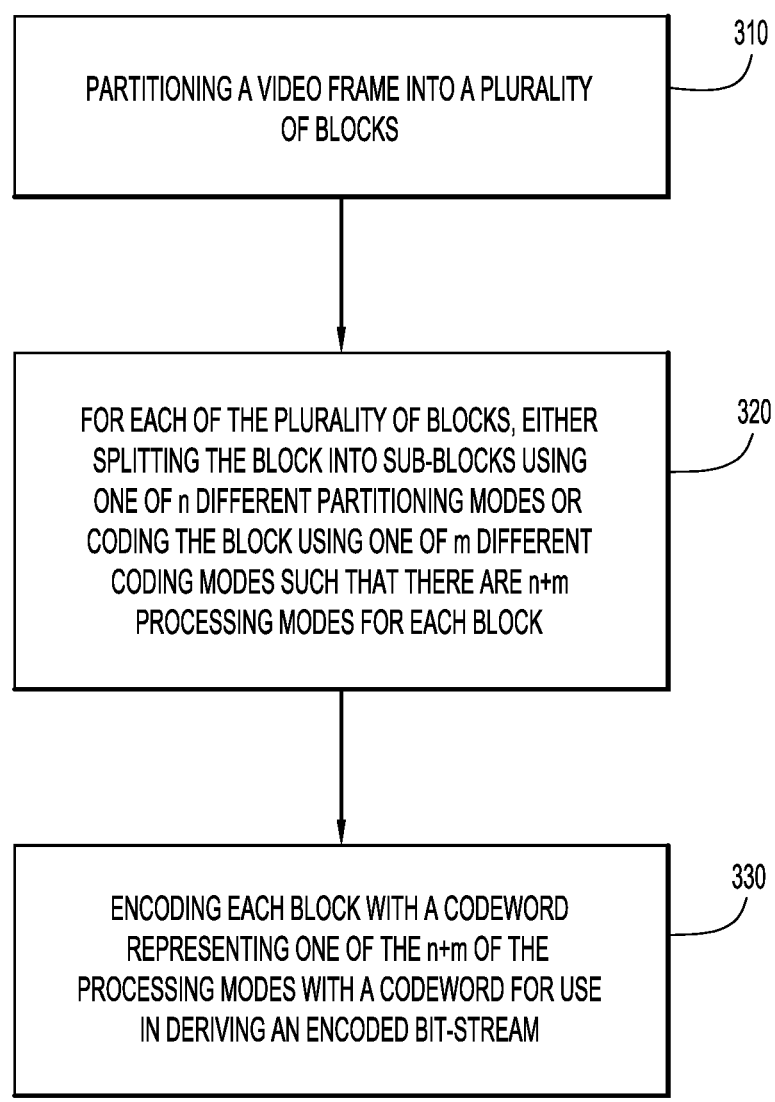
FIG. 3 is a flow chart illustrating a method performed at an encoder, according to an example embodiment.

Reference is now made to FIG. 3. FIG. 3 illustrates a flow chart of a process 300 performed at an encoder, e.g., an encoder as shown in FIG. 1. The process 300 involves operating on video frames of a video signal that is to be encoded, such as for transmission or storage. At step 310, a video frame of the video signal is partitioned into a plurality of blocks. The partitioning can be a fixed partitioning into blocks of equal size that are typically processed in raster-scan order within a frame, or the partitioning can be an adaptive partitioning resulting, for example, from applying an adaptive hierarchical quad-tree structure that splits each of the fixed size blocks into smaller blocks. A block can be either a fixed size block from a fixed partitioning scheme, or a sub-block representing a node in an adaptive hierarchical block structure (e.g. quad-tree structure).

At 320, for each of the plurality of blocks, the block is either split into sub-blocks using one of n different partitioning modes or the block is coded using one of m different coding modes such that there are n+m processing modes for each block. At 330, each of the plurality of blocks is encoded with a codeword representing one of the n+m processing modes for use in deriving an encoded bit-stream. Each of the processing modes may be encoded with a codeword derived from a variable length code (VLC). If a hierarchical block structure is used, a codeword representing one of the n+m processing nodes is sent at/for each node in the hierarchical structure.

SPECIFIC EXAMPLE

The following is a description of a specific example, and this is not meant to be limiting. Reference is made to FIG. 4A for the description of this example.

For each block of size N×N (64>=N>8) that can be split into sub-blocks of size (N/2)×(N/2) the following mutually exclusive events are jointly encoded using a single VLC code as follows (example using 4 reference frames):

| | |
|---|---|
| SKIP | 1 |
| SPLIT | 01 |
| INTER0 | 001 |
| MERGE | 0001 |
| BIPRED | 00001 |
| INTRA | 000001 |
| INTER1 | 0000001 |
| INTER2 | 00000001 |
| INTER3 | 00000000 | where INTERp indicates an inter block where motion compensation is done using a reference frame with index equal to p. If less than 4 reference frames are used, a shorter VLC table is used.

For the smallest block size (8×8 in this example), where the block cannot be split into smaller blocks, the following mutually exclusive events are jointly encoded using a single VLC code as follows (example using 4 reference frames):

| | |
|---|---|
| SKIP | 1 |
| INTER0 | 01 |
| MERGE | 001 |
| BIPRED | 0001 |
| INTRA | 00001 |
| INTER1 | 000001 |
| INTER2 | 0000001 |
| INTER3 | 0000000 |

Additionally, depending on information from the blocks to the left and above (e.g. skip/no-skip and coded block pattern (CBP)), a different variable length code can be used, such as (N>8):

| | |
|---|---|
| SPLIT | 1 |
| INTER0 | 01 |
| SKIP | 001 |
| MERGE | 0001 |
| INTRA | 00001 |
| INTER1 | 000001 |
| INTER2 | 0000001 |
| INTER3 | 00000001 |
| BIPRED | 00000000 |

Another example illustrating three different split modes (n=3) and 4 different coding modes (m=4) is shown in FIG. 4B (N>8).

There are numerous variations to the encoding depicted in FIGS. 4A and 4B and described above. For example, the n partitioning modes may include partitioning symmetrically into N×M sub-blocks where all sub-blocks have the same size horizontally, and all sub-blocks have the same size vertically. The n partitioning modes may include partitioning asymmetrically into N×M sub-blocks where at least two sub-blocks have different size either horizontally or vertically. Further still, the n partitioning modes may include a partitioning mode in which the block is first split horizontally and then at least one resulting sub-block is split vertically, or a partitioning mode in which the block is first split vertically and then at least one resulting sub-block is split horizontally.

Moreover, the m coding modes may include intra prediction (INTRA), skip, merge, inter prediction with uni-prediction (INTER), and inter prediction with bi-prediction (BI-PRED). The inter prediction with uni-prediction mode may include several sub-modes that depend on a reference index or some other parameter.

Figure 5:
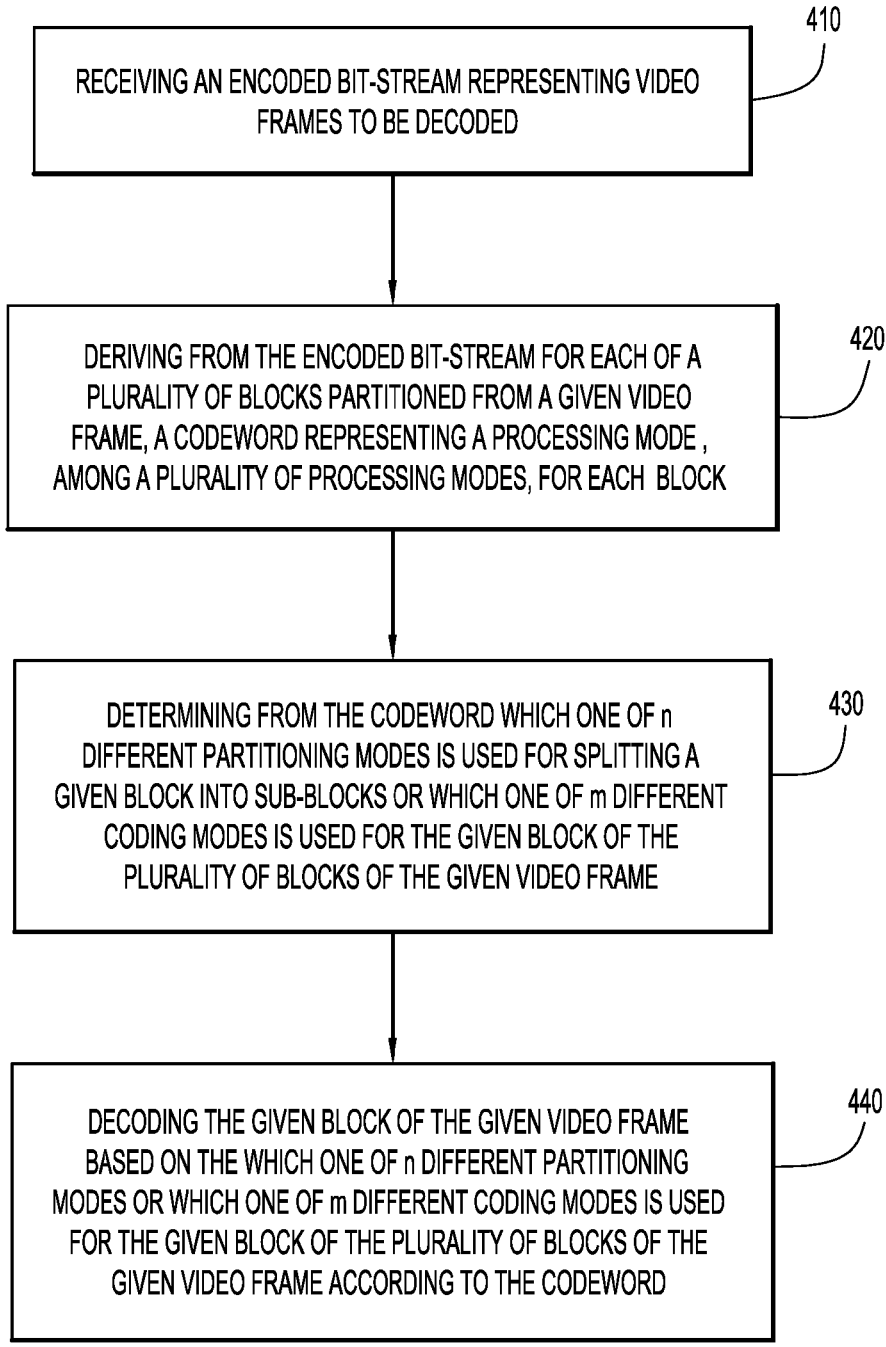
FIG. 5 is a flow chart illustrating a method performed at a decoder, according to an example embodiment.

Reference is now made to FIG. 5 for a description of a method 400 performed at a decoder, e.g., a decoder as shown in FIG. 2, according to an example embodiment. At 410, an encoded bit-stream representing video frames of a video signal to be decoded is received (or retrieved from storage). At 420, a codeword is derived from the encoded bit-stream for each of a plurality of blocks partitioned from a given video frame, the codeword representing a processing mode, among a plurality of processing modes, for each block. At 430, it is determined from the codeword which one of n different partitioning modes is used for splitting a given block into sub-blocks or which one of m different coding modes is used for the given block of the plurality of blocks of the given video frame. At 440, the given block of the given video frame is decoded based on the which one of n different partitioning modes or which one of m different coding modes is used for the given block of the plurality of blocks of the given video frame according to the codeword.

As described above for the encoding method, there are similar variations applicable to the decoding method. The codeword may be derived from a variable length code. Different variable length codes are used based on information from neighbor blocks for a given one of the plurality of blocks. The n partitioning modes may include partitioning symmetrically into N×M sub-blocks where all sub-blocks have the same size horizontally, and all sub-blocks have the same size vertically. The n partitioning modes partitioning asymmetrically into N×M sub-blocks where at least two sub-blocks have different size either horizontally or vertically. The n partitioning modes may include a partitioning mode in which the block is first split horizontally and then at least one resulting sub-block is split vertically, or a partitioning mode in which the block is first split vertically and then at least one resulting sub-block is split horizontally. Furthermore, the m coding modes may include intra prediction, skip, merge, inter prediction with uni-prediction, and inter prediction with bi-prediction. The inter prediction with uni-prediction mode may include several sub-modes that depend on a reference index.

Again, to summarize, a block of size N×M of a video frame can be either split into smaller blocks in n different ways (e.g., horizontal, vertical, quad, etc.), or alternatively it can be coded using one out of m different coding modes (e.g. intra, inter, bi-prediction, etc.). Since splitting into smaller sub-blocks and coding the N×M block in one of the m possible ways are mutually exclusive, there are n+m distinct possibilities for processing the block further. The n+m possible ways of processing the N×M blocks are assigned a code (e.g., a number) and coded with a codeword derived from a VLC table. This achieves efficient combined coding of split information and other block-level parameters.

Figure 6:
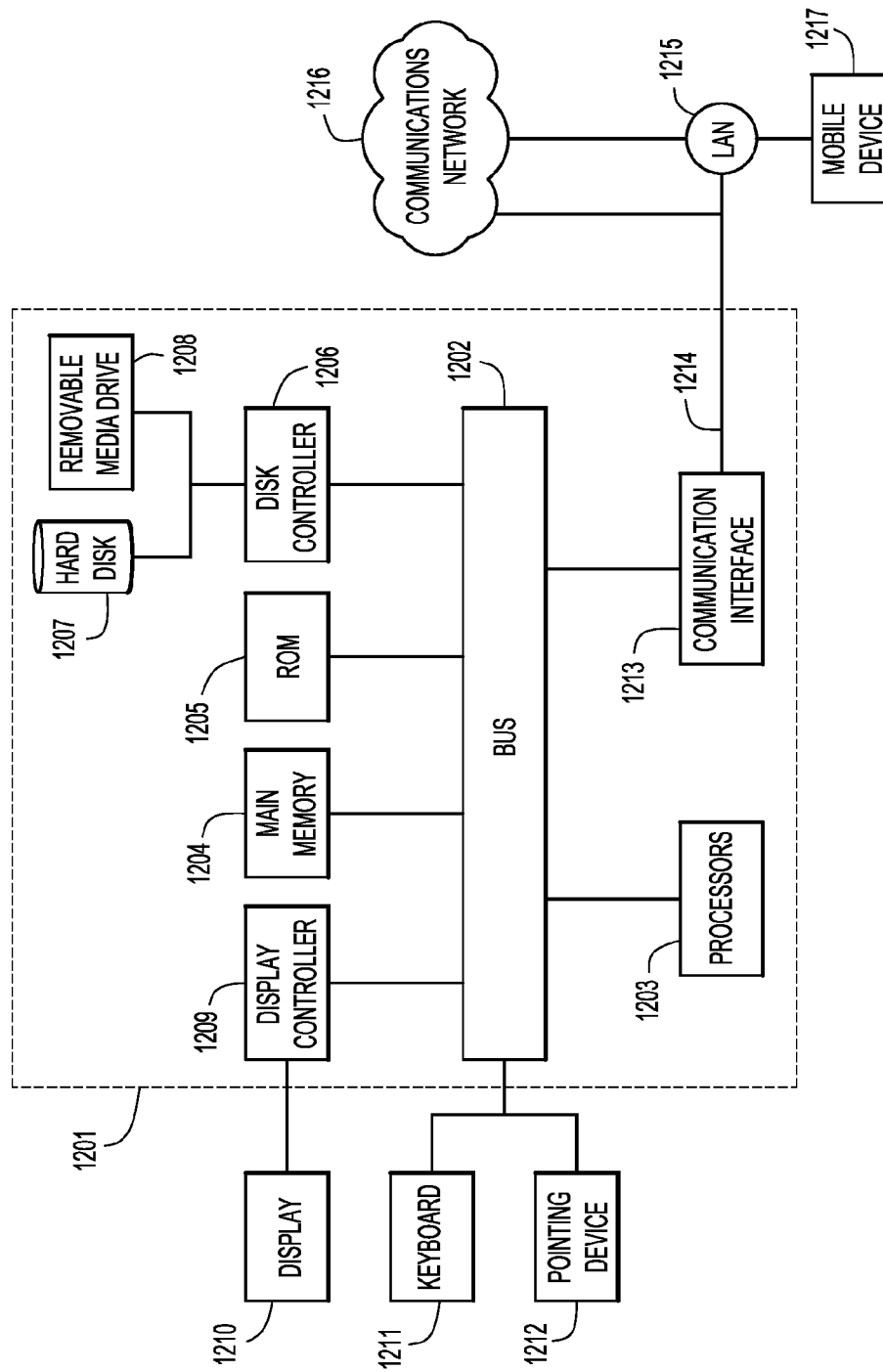
FIG. 6 is a block diagram of a computing device configured to perform the encoding and decoding techniques presented herein, according to an example embodiment.

FIG. 6 illustrates a computer system 1201 upon which an embodiment of the methods presented herein may be implemented. The computer system 1201 may be programmed to implement a computer based device, such as a video conferencing endpoint or any device includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

To summarize, in one form, a method is provided comprising: partitioning a video frame into a plurality of blocks; for each of the plurality of blocks, either splitting the block into sub-blocks using one of n different partitioning modes or coding the block using one of m different coding modes such that there are n+m processing modes for each block; and encoding each block with a codeword representing one of the n+m processing modes for use in deriving an encoded bit-stream.

In another form, a method is provided comprising: receiving an encoded bit-stream representing video frames to be decoded; deriving from the encoded bit-stream for each of a plurality of blocks partitioned from a given video frame, a codeword representing a processing mode, among a plurality of processing modes, for each block; determining from the codeword which one of n different partitioning modes is used for splitting a given block into sub-blocks or which one of m different coding modes is used for the given block of the plurality of blocks of the given video frame; and decoding the given block of the given video frame based on the which one of n different partitioning modes or which one of m different coding modes is used for the given block of the plurality of blocks of the given video frame according to the codeword.

In still another form, one or more non-transitory computer readable storage media encoded with executable instructions that, when executed by a processor, cause the processor to perform operations comprising: receiving an encoded bit-stream representing video frames to be decoded; deriving from the encoded bit-stream for each of a plurality of blocks partitioned from a given video frame, a codeword representing a processing mode, among a plurality of processing modes, for each block; determining from the codeword which one of n different partitioning modes is used for splitting a given block into sub-blocks or which one of m different coding modes is used for the given block of the plurality of blocks of the given video frame; and decoding the given block of the given video frame based on the which one of n different partitioning modes or which one of m different coding modes is used for the given block of the plurality of blocks of the given video frame according to the codeword.

In still another form, an apparatus is provided comprising: a communication interface configured to receive signals, including signals carrying an encoded bit-stream representing video frames to be decoded. The apparatus further includes a processor configured to: derive from the encoded bit-stream for each of a plurality of blocks partitioned from a given video frame, a codeword representing a processing mode, among a plurality of processing modes, for each block; determine from the codeword which one of n different partitioning modes is used for splitting a given block into sub-blocks or which one of m different coding modes is used for the given block of the plurality of blocks of the given video frame; and decode the given block of the given video frame based on the which one of n different partitioning modes or which one of m different coding modes is used for the given block of the plurality of blocks of the given video frame according to the codeword. The processor may be stand-alone processor, e.g., microprocessor, or one or more integrated circuits, e.g., one or more application specific integrated circuits.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   partitioning a video frame into a plurality of blocks;
   for each of the plurality of blocks, either splitting the block into sub-blocks using one of n different partitioning modes or coding the block using one of m different coding modes such that there are n+m processing modes for each block; and
   encoding a given block with a codeword representing one of the n+m processing modes for use in deriving an encoded bit-stream, wherein encoding includes using different variable length codes depending on information from blocks to the left and above the given block.

2. The method of claim 1, wherein the information from blocks to the left and above the given block includes information indicating a skip mode or no skip mode.

3. The method of claim 2, wherein the different variable length codes for the different coding modes include:

| | |
|---|---|
| SPLIT | 1 |
| INTER0 | 01 |
| SKIP | 001 |
| MERGE | 0001 |
| INTRA | 00001 |
| INTER1 | 000001 |
| INTER2 | 0000001 |
| INTER3 | 00000001 |
| BIPRED | 00000000. |

4. The method of claim 1, wherein the n partitioning modes include partitioning symmetrically into N×M sub-blocks where all sub-blocks have the same size horizontally, and all sub-blocks have the same size vertically.

5. The method of claim 1, wherein the n partitioning modes include partitioning asymmetrically into N×M sub-blocks where at least two sub-blocks have different size either horizontally or vertically.

6. The method of claim 1, wherein the n partitioning modes include a partitioning mode in which the block is first split horizontally and then at least one resulting sub-block is split vertically, or a partitioning mode in which the block is first split vertically and then at least one resulting sub-block is split horizontally.

7. The method of claim 1, wherein the m coding modes include intra prediction, skip, merge, inter prediction with uni-prediction, and inter prediction with bi-prediction.

8. The method of claim 7, wherein the inter prediction with uni-prediction mode includes several sub-modes that depend on a reference index.

9. A method comprising:
   receiving an encoded bit-stream representing video frames to be decoded;
   deriving from the encoded bit-stream for each of a plurality of blocks partitioned from a given video frame, a codeword representing a processing mode, among a plurality of processing modes, for each block, wherein the codeword for a given block is derived from different variable length codes depending on information from blocks to the left and above the given block;
   determining from the codeword which one of n different partitioning modes is used for splitting the given block into sub-blocks or which one of m different coding modes is used for the given block of the plurality of blocks of the given video frame; and
   decoding the given block of the given video frame based on the which one of n different partitioning modes or which one of m different coding modes is used for the given block of the plurality of blocks of the given video frame according to the codeword.

10. The method of claim 9, wherein the information from blocks to the left and above the given block includes information indicating a skip mode or no skip mode.

11. The method of claim 10, wherein the different variable length codes include:

| | |
|---|---|
| SPLIT | 1 |
| INTER0 | 01 |
| SKIP | 001 |
| MERGE | 0001 |
| INTRA | 00001 |
| INTER1 | 000001 |
| INTER2 | 0000001 |
| INTER3 | 00000001 |
| BIPRED | 00000000. |

12. The method of claim 9, wherein the n partitioning modes include partitioning symmetrically into N×M sub-blocks where all sub-blocks have the same size horizontally, and all sub-blocks have the same size vertically.

13. The method of claim 9, wherein the n partitioning modes include partitioning asymmetrically into N×M sub-blocks where at least two sub-blocks have different size either horizontally or vertically.

14. The method of claim 9, wherein the n partitioning modes include a partitioning mode in which the block is first split horizontally and then at least one resulting sub-block is split vertically, or a partitioning mode in which the block is first split vertically and then at least one resulting sub-block is split horizontally.

15. The method of claim 9, wherein the m coding modes include intra prediction, skip, merge, inter prediction with uni-prediction, and inter prediction with bi-prediction.

16. The method of claim 15, wherein the inter prediction with uni-prediction mode includes several sub-modes that depend on a reference index.

17. One or more non-transitory computer readable storage media encoded with executable instructions that, when executed by a processor, cause the processor to perform operations comprising:

receiving an encoded bit-stream representing video frames to be decoded;

deriving from the encoded bit-stream for each of a plurality of blocks partitioned from a given video frame, a codeword representing a processing mode, among a plurality of processing modes, for each block, wherein the codeword for a given block is derived from different variable length codes depending on information from blocks to the left and above the given block;

determining from the codeword which one of n different partitioning modes is used for splitting the given block into sub-blocks or which one of m different coding modes is used for the given block of the plurality of blocks of the given video frame; and decoding the given block of the given video frame based on the which one of n different partitioning modes or which one of m different coding modes is used for the given block of the plurality of blocks of the given video frame according to the codeword.

18. The non-transitory computer readable storage media of claim 17, wherein the information from blocks to the left and above the given block includes information indicating a skip mode or no skip mode.

19. The non-transitory computer readable storage media of claim 18, wherein the different variable length codes include:

| | |
|---|---|
| SPLIT | 1 |
| INTER0 | 01 |
| SKIP | 001 |
| MERGE | 0001 |
| INTRA | 00001 |

-continued

| | |
|---|---|
| INTER1 | 000001 |
| INTER2 | 0000001 |
| INTER3 | 00000001 |
| BIPRED | 00000000. |

20. The non-transitory computer readable storage media of claim 17, wherein the n partitioning modes include partitioning symmetrically into N×M sub-blocks where all sub-blocks have the same size horizontally, and all sub-blocks have the same size vertically.

21. The non-transitory computer readable storage media of claim 17, wherein the n partitioning modes include partitioning asymmetrically into N×M sub-blocks where at least two sub-blocks have different size either horizontally or vertically.

22. The non-transitory computer readable storage media of claim 17, wherein the n partitioning modes include a partitioning mode in which the block is first split horizontally and then at least one resulting sub-block is split vertically, or a partitioning mode in which the block is first split vertically and then at least one resulting sub-block is split horizontally.

23. The non-transitory computer readable storage media of claim 17, wherein the m coding modes include intra prediction, skip, merge, inter prediction with uni-prediction, and inter prediction with bi-prediction.

24. The non-transitory computer readable storage media of claim 23, wherein the inter prediction with uni-prediction mode includes several sub-modes that depend on a reference index.

* * * * *